United States Patent
Markopulos

[11] Patent Number: 6,165,326
[45] Date of Patent: Dec. 26, 2000

[54] FACILITY FOR DESALINATING OF PURIFYING SEA WATER OR BRACKISH WATER BY MEANS OF SOLAR ENERGY

[76] Inventor: Johannes Markopulos, Leesdorferstrasse 101, A-2512 Tribuswinkel, Austria

[21] Appl. No.: 09/381,124
[22] PCT Filed: Mar. 10, 1998
[86] PCT No.: PCT/AT98/00061
§ 371 Date: Sep. 10, 1999
§ 102(e) Date: Sep. 10, 1999
[87] PCT Pub. No.: WO98/40313
PCT Pub. Date: Sep. 17, 1998

[30] Foreign Application Priority Data

Mar. 11, 1997 [AT] Austria .......................................... 417/97

[51] Int. Cl.⁷ ..................... B01D 3/10; C02F 1/14
[52] U.S. Cl. ............... 202/234; 159/903; 202/185.3; 202/205; 203/11; 203/22; 203/DIG. 8; 203/DIG. 11; 203/DIG. 17
[58] Field of Search .................... 202/234, 205, 202/185.3; 203/DIG. 11, 22, 11, DIG. 8, DIG. 20, 4, 2, 10, DIG. 17; 159/903, DIG. 39; 136/206; 62/479; 126/635; 60/641.1; 165/45

[56] References Cited

U.S. PATENT DOCUMENTS

| | | | |
|---|---|---|---|
| 4,180,057 | 12/1979 | Ward | 126/449 |
| 4,209,364 | 6/1980 | Rothschild | 203/11 |
| 4,235,679 | 11/1980 | Swaidan | 202/234 |
| 4,249,317 | 2/1981 | Murdock | 203/DIG. 1 |
| 4,343,683 | 8/1982 | Diggs | 203/2 |
| 4,525,242 | 6/1985 | Iida | 202/177 |
| 5,608,268 | 3/1997 | Senanayake | 60/641.12 |
| 6,080,927 | 6/2000 | Johnson | 136/248 |

FOREIGN PATENT DOCUMENTS

| | | | |
|---|---|---|---|
| 0345236 | 6/1989 | European Pat. Off. | |
| 2101951 | 3/1972 | France | B01D 3/00 |
| 2379482 | 9/1978 | France | C02B 1/06 |
| 43 21 192 | 1/1995 | Germany | C02F 1/14 |
| WO 80/00077 | 1/1980 | WIPO | C02B 1/06 |

*Primary Examiner*—Virginia Manoharan
*Attorney, Agent, or Firm*—Karl Hormann

[57] ABSTRACT

A facility for the desalination and purification of sea water or brackish water by solar energy provided with a closed cycle including a thermal solar collector and a heat exchanger in which a heat transfer medium is circulating, and a basin for receiving the sea water or brackish water with the heat exchanger being placed in the basin for heating and evaporating water. A cooling surface is disposed above the basing for condensing the evaporated water which is then diverted to water collectors. The solar collector is located above the cooling surface so as to keep it in the shade.

16 Claims, 3 Drawing Sheets

FACILITY FOR DESALINATING OF PURIFYING SEA WATER OR BRACKISH WATER BY MEANS OF SOLAR ENERGY

BACKGROUND OF THE INVENTION

1. Field of the Invention

The present invention relates to a plant for desalination or purification of sea or brackish water by means of solar energy, having a closed circuit comprising a thermal solar collector and a heat exchanger, in which circuit a heat transfer medium circulates, a tank which can be charged with the sea or brackish water to be treated, and in which the heat exchanger is arranged to heat and evaporate the same, a cooling surface which lies above the tank for condensation of the rising steam, and water collectors which are arranged below part regions of the cooling surface for catching the condensed water.

2. The Prior Art

It is known that there is a shortage of drinking water on certain islands in the Mediterranean as well as in other regions. This problem is provisionally solved either by transport of drinking water from the mainland or by various energy-consuming processes (for example desalination of sea water by means of the method of reversing the osmotic pressure). A further classic possibility is the direct heating of the sea water by the sun in a tank, and specifically through a glass disc or a transparent film which serves as a cover at the same time, wherein evaporation and catching of condensed water are carried out with the aid of the same glass cover. U.S. Pat. Nos. 4,235,679 and 4,343,683, 4,525,242 and German Patent 4 321 192 are representative of the latest state of this art of desalination.

These classic possibilities either require very considerable energy or as is the case with methods which utilize solar energy—of very low efficiency, since in the known constructions the cover (glass disc) which is heated by the sun also serves as cooling a surface with resultant very high losses of evaporated water. Furthermore, these methods may not meet the necessary requirement, because they are associated with a limited capacity.

The invention therefore, aims at providing a plant for desalination or purification of sea or brackish water, which is not only of a considerably higher efficiency than known solutions, but also requires minimum space.

SUMMARY OF THE INVENTION

In accordance with a preferred embodiment of the invention, there is provided a plant of the type mentioned in the introduction, which is characterised by a solar collector arranged at a distance from and above the cooling surface to shade the latter, the cooling surface being made from heat-conducting material, and the gap between cooling surface and solar collector being open to permit lateral flow of ambient air.

The gain in space achieved by the arrangement of solar collector and cooling surface one above the other is utilised in this manner at the same time to shade and hence cool the cooling surface, wherein the free flow through the gap between solar collector and cooling surface considerably increases cooling of the latter. Compared to the known constructions, the plant of the invention achieves a considerably higher efficiency for the same standing area requirement.

In a preferred embodiment of the invention for plants in which the solar collector is inclined with respect to the horizontal, provision is made in that the cooling surface is at a steeper angle than the solar collector, so that the said gap is tapered in the upward direction like a nozzle. Air circulation is thus considerably enhanced through the said gap, as described later in more detail.

Provision is preferably made in that the space between tank and cooling surface is closed on all sides and can be subjected to vacuum pressure by a vacuum pump to improve evaporation.

In a further embodiment, the cooling surface is of a corrugated structure seen in vertical section, and the water collectors are designed as collecting channels running at a distance below the corrugation troughs or as a continuous fine coated mesh.

It is particularly advantageous if the tank has a wedge shape tapering downwards seen in vertical section. As a result of this truncated structure, every time sea water or brackish water flows into the tank there is a circular movement which promotes the deposition of residues at the base of the tank.

It is particularly favourable if a conveyor screw leading to a trough chain conveyer is provided on the base of the tank to discharge residues, such as brine or the like.

If the plant is employed specially for desalination of sea water, a further preferred embodiment of the invention consists in the tank lying essentially at sea level and being connected to the sea via a pipe connection flowed through at high tide and falling dry at low tide. Low tide and high tide may thus be utilised to establish an automatic batch-wise charging cycle for the tank.

Alternatively, the tank may be charged via a feed pump connected in the pipe connection from a sea or brackish water reservoir, for example a shoreline well.

On the basis of the high efficiency of the plant, in a further embodiment of the invention an absorber for operating a cooling house or a steam turbine for operating a generator may be connected in series in the closed circuit between the solar collector and the heat exchanger, and they can be bridged preferably in times of weak solar radiation with the aid of a by-pass circuit.

In addition, photovoltaic panels may also be provided to operate electrically feedable parts of the plant, so that the entire plant is independent.

According to a further particularly advantageous embodiment of the invention, provision may be made in that the pipe connection before it opens into the tank is guided via a further heat exchanger which is arranged in heat-conducting relationship with the cooling surface. The cooling surface may be cooled even more strongly in this manner due to the lower initial temperature of the sea or brackish water to be treated and at the same time the latter may be pre-heated, so that the efficiency of the plant is increased still further.

DESCRIPTION OF THE SEVERAL DRAWINGS

The invention is illustrated in more detail below using an exemplary embodiment shown in the drawings. In the drawings FIG. 1 shows the plant of the invention in a partially broken front view, FIG. 2 shows a horizontal section through the plant of FIG. 1 in the direction of the sectional line B—B of FIG. 1, FIG. 3 shows a vertical section through the plant of FIG. 1 in the direction of line A—A of FIG. 1, FIG. 4 shows a partial cross-section through the cooling surface corresponding to detail X of FIG. 3, FIG. 5 shows a vertical section through a second embodiment of the plant analogously to the representation of FIG. 3, and FIG. 6 shows a block diagram of the heat transfer medium circuit of the plant of FIG. 5.

DETAILED DESCRIPTION OF PREFERRED EMBODIMENTS

Figure 1:
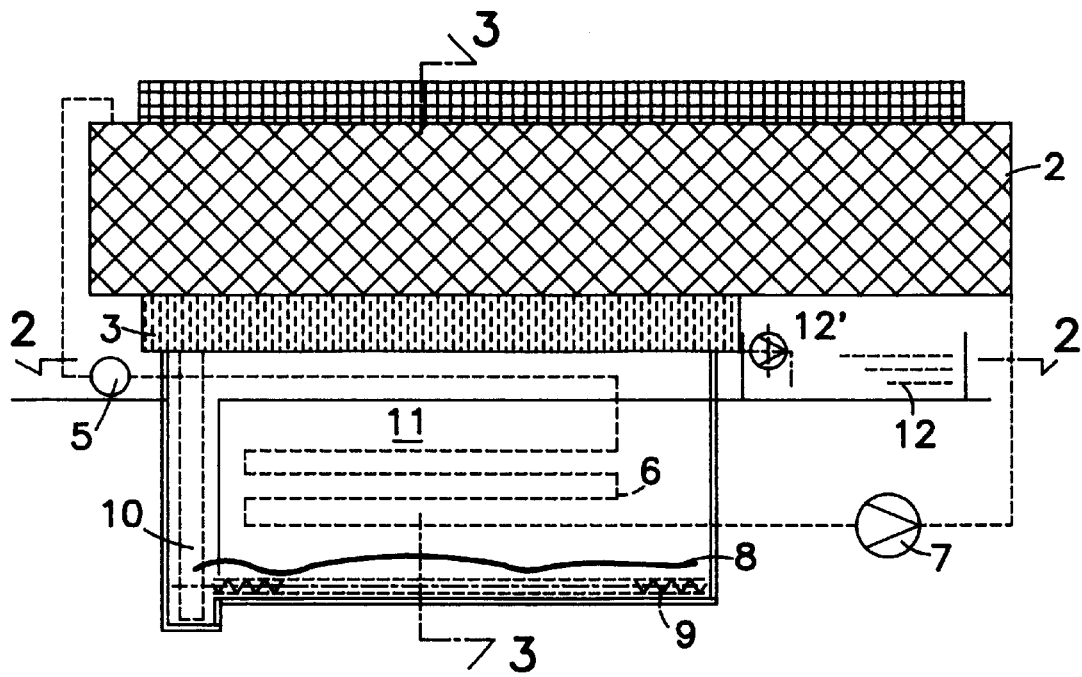
Figure 2:
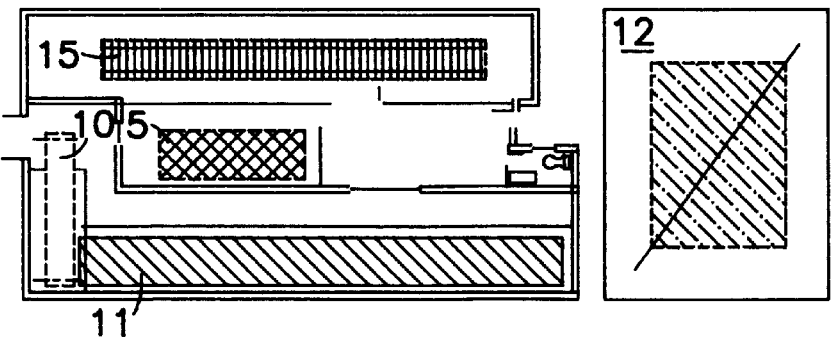
Figure 3:
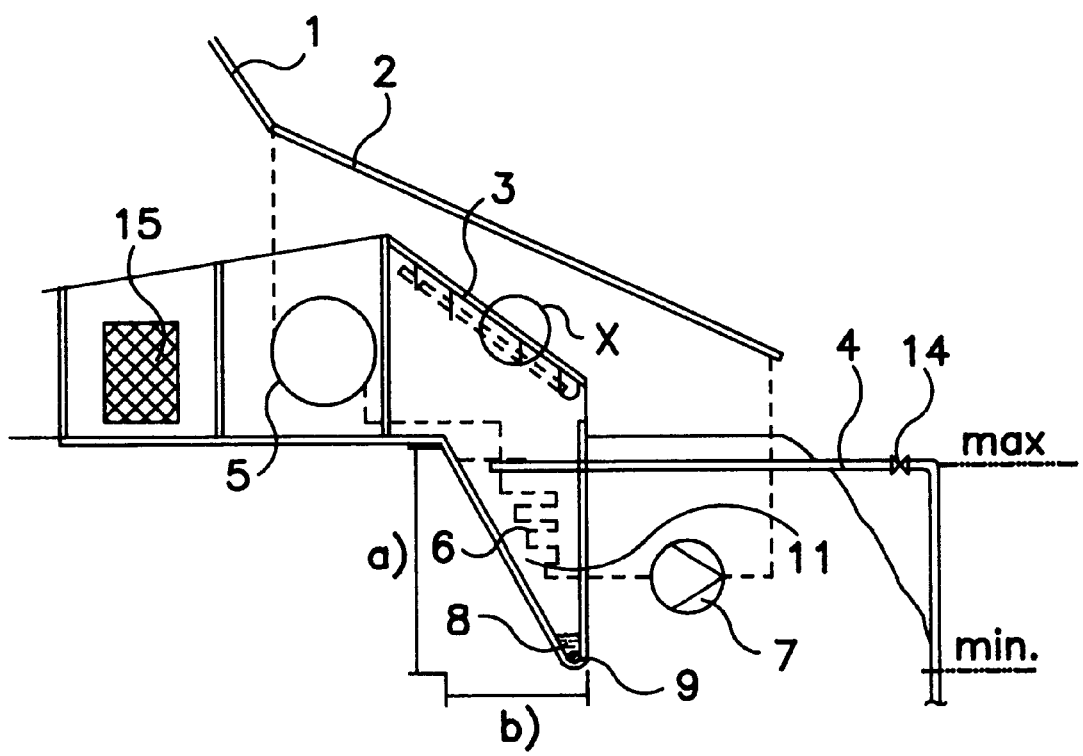
Figure 4:
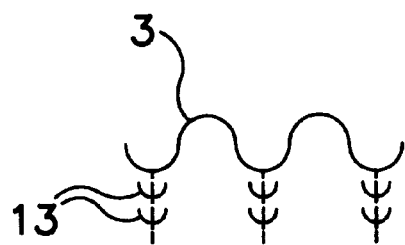

FIGS. 1–4 show a first embodiment of the plant of the invention, and specifically the variant with additional in-series connection of an absorber 5 for operation of a cooling house 15. A thermal solar collector 2 heats a transfer medium (for example a type of mineral oil) specific to this variant situated in the closed circuit to about 200° C. The transfer medium is supplied to an absorber 5, which ensures production of cold in the cooling house 15. The transfer medium cooled to about 90 to 100° C. in the absorber 5 by releasing energy is then supplied to a heat exchanger 6 which is situated in the lower half of a tank 11 filled with sea water. After further cooling of the transfer medium in the heat exchanger 6 by temperature equalisation to the temperature of the water in the tank, which is about 20° C. for a fresh supply of sea water through a pipe connection 4 of the tank 11 with the sea, and after interrupting the water supply is heated by temperature equalisation to about 60 to 70° C., a vacuum or circulating pump 7 ensures closing of the circuit, so that the cooled transfer medium is recirculated in the thermal solar collector 2.

The sea water situated in the sea water tank 11 is evaporated by continuous heating. The air layers enriched (saturated) with evaporated fresh water are passed to a cooling surface 3 consisting of rust-free metal (for example aluminium) in corrugated form and condense there by natural convection, according to which warm air layers are lighter and rise upwards. For appropriate collection of condensed water, water droplets, which flow into the corrugation troughs and drop downwards due to the incline of the corrugations of the cooling surface (see detail X FIG. 4), are formed. These droplets are collected in water collectors 13 consisting of plastic (to prevent the rusting process, because the condensed water is strongly enriched with oxygen) and passed to the adjacent fresh water tank 12 via water channels.

As a result of continuous evaporation in the sea water tank 11 the sea water remaining therein is enriched (saturated) with salt, and after a few days a brine 8 is formed on the base of the tank 11. This brine 8 should be removed periodically according to requirement (for example during the high-tide phase, so that the free space resulting from removal of the brine may be refilled). The brine 8 is transported with the aid of a conveyor screw 9 mounted on the base of the sea water tank 11 to a trough chain conveyer 10 installed on the side of the sea water tank 11 and by means of the trough chain conveyer 10, which is provided with a dropping facility, brought onto the surface where it is then stored in the open to dry out using smaller containers in flat pans (not shown in the drawing). Hence salt, which can be sold on the free market, is produced as a by-product during operation of the plant.

The tank 11 is a cone-shaped structure, so that a circular movement is produced in the water of the tank by the flowing-in of sea water during every sea water supply and serves to purify or collect the brine 8 on the tank base. The dimensions of the sea water tank 11 should be fixed according to requirement, and the ratio of height a to width b should be investigated empirically by tests.

The pipe connection 4 of the tank 11 with the open sea terminates horizontally on the inner side of the tank 11 at the inclined surface. The other end of the pipe connection 4 is bent downwards in the open sea, and specifically at least 200 cm away from the shoreline, and is always immersed (even at the lowest point of the sea surface at low tide) at least 50 cm in the water. On the one hand floating deposits and on the other hand sand passing to the sea water tank are thus avoided. Charging of the tank 11 with sea water takes place "automatically". It starts at the moment when the high tide reaches the lower pipe edge of the horizontal part of the pipe connection 4, and ends at the moment when the low tide reaches approximately the same pipe edge of the horizontal part of the pipe connection 4, wherein air passes from the side of the sea water tank 11 into pipe 4 and the siphon effect is interrupted. Interruption of the sea water supply is necessary, so that the water in the tank 11 may reach or maintain the temperatures necessary for evaporation for a longer period of time. Since the warmer water layers are essentially on the water surface, they are easily cooled during each supply of fresh water and thus reduce or interrupt the evaporation process.

A fine mesh is fixed in front of the opening of the connection piece of the pipe connection 4 into the open sea, so that fish cannot swim into the interior of the tank 11. Furthermore, the pipe connection is provided with a stop valve 14 so that in winter and during the weakest solar radiation, the sea water supply may be interrupted in order to be able to thoroughly clean the tank and the machine equipment of various sea micro-organisms which may be formed at higher temperatures, as well as other deposits.

The arrangement of the thermal solar collector 2 with respect to the cooling surface 3 is selected so that it preferably faces west (Mediterranean area). The solar collector 2 is formed as roofing for the cooling surface 3 which can be walked on and is heavily insulated at the bottom. The space between the solar collector 2 and the cooling surface 3 is open from all sides, so that wind, regardless from which side it comes, may easily reach the cooling surface 3. So that an air current is produced between the solar collector 2 and cooling surface 3 even when the wind stops, the angle of the solar collector 2 to the angle of the cooling surface 3 is such that the gap has a wedge shape or produces a type of nozzle. On the upper side of the cooling surface, where the narrowest point of the nozzle is, the air is heated more strongly, and due to the wedge shape a higher rate of air flow is produced at this point. Hence a more rapid air circulation is produced, as a result of which fresh air is supplied continuously and hence improved cooling is achieved. The solar collector also has dimensions for its surface area so that constant shading of the cooling surface is guaranteed.

Figure 5:
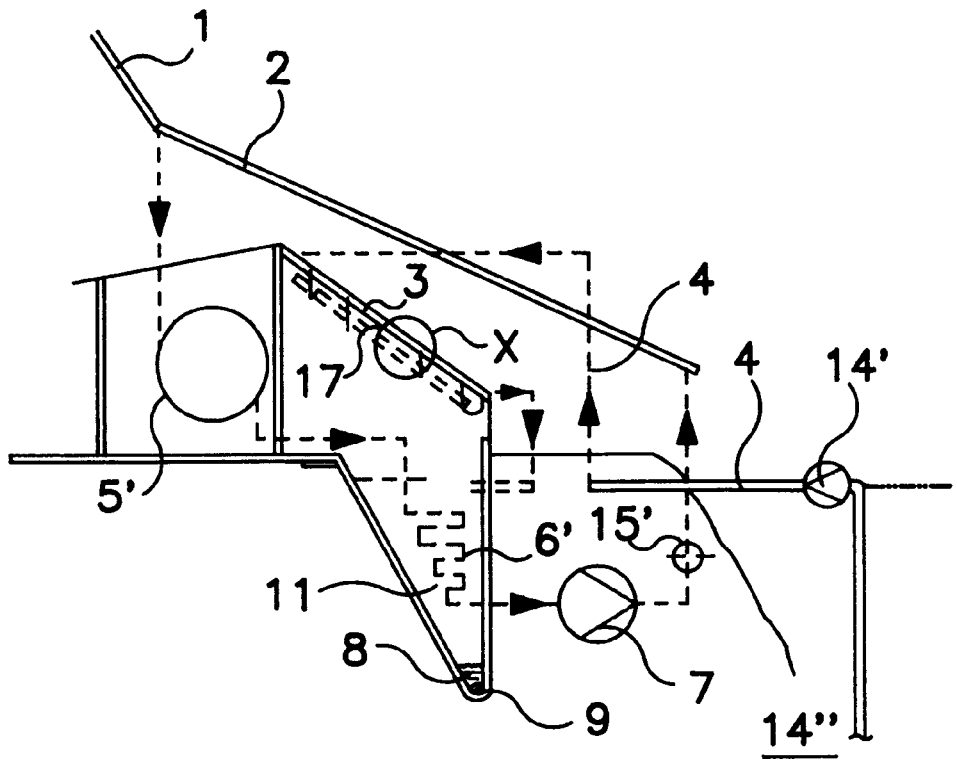
Figure 6:
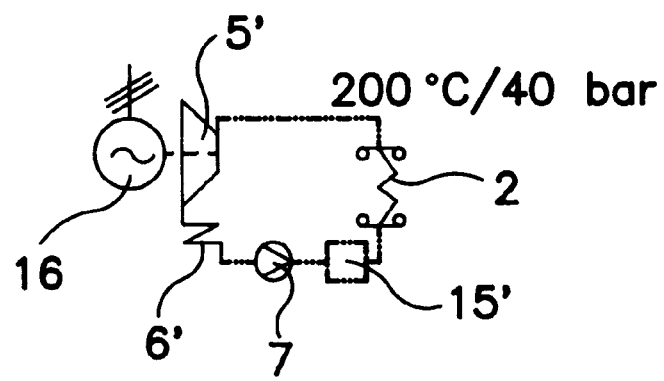

FIGS. 5 and 6 show a second embodiment of the plant, and specifically the variant with additional in-series connection of a steam turbine 5' for operating an electric generator 16. The thermal solar collector 2 heats the special coolant (for example lithium bromide water solution) situated in the closed circuit for this variant and which is used as transfer medium, to about 200° C. and develops a pressure of 40 bar. The transfer medium is supplied to a steam turbine 5' which ensures operation of the generator 16. The transfer medium cooled to about 90 to 100° C. in the steam turbine 5' by release of energy is then supplied to a vacuum condenser 6' which is situated as a heat exchanger in the tank 11 filled with sea water. After further cooling of the transfer medium in the condenser 6' by temperature equalisation to the temperature of the water in the tank, it is supplied to a condenser 15' under pressure via the vacuum pump 7. From there the cooled transfer medium passes back to the thermal solar collector 2 which closes the circuit.

An alternative type of charging of the tank 11 is also shown using the embodiment of FIGS. 5 and 6. The tank 11 is charged here via the pipe connection 4 from a supply of sea or brackish water, for example the sea, a shoreline well 14", a marsh etc. with the aid of a feed pump 14' connected in the pipe connection 4. The feed pump 14' is preferably operated intermittently to guarantee batch-wise charging of the tank 11.

The low initial temperature of the sea or brackish water to be treated may also be utilised to pre-cool the cooling surface 3 or to pre-heat the water to be treated. For this purpose, as shown in FIG. 5, the pipe connection 4 may be guided via a further heat exchanger 17, which is arranged in heat-conducting relationship with the cooling surface 3, for example lies below the cooling surface between cooling surface 3 and water collectors 13.

During the winter or the evening hours, fresh water production is also possible for all variants. In such periods of weak solar radiation, due to electronic control, the transfer medium is supplied via a by-pass circuit (not shown) directly to the heat exchanger 6, 6' in the water tank 11 past the absorber 5 or the steam turbine 5', so that even for weak heating of the transfer medium enough energy is still available to heat the sea water in the tank 11 and to carry out evaporation, that is fresh water production, for a longer time. Fresh water production is even possible in the night, since the sea water heated in the day may condense down to a temperature drop in the region of 30° C., because in the evening a temperature drop for the ambient air takes place at the same time, resulting in the cooling surface 3 likewise cooling more strongly.

Of course it is also possible to connect neither an absorber 5 nor a steam turbine 5', that is the closed heat medium transfer circuit then consists only of solar collector 2, heat exchanger 6 and in any case circulating pump 7.

The space between the tank 11 and the cooling surface 3 is preferably closed on all sides and can be placed under negative pressure by means of a vacuum pump 12'. The vacuum pump 12' may be at the same time any pump which draws the condensed water from the collecting channels of the water collector 13 and conveys it to the fresh water tank 12.

Photovoltaic collectors 1 are also provided in the plant and produce electric current from solar energy which is used for operating the circulating pump 7, the vacuum pump 12', the feed pump 14' and the entire control of the plant. The system is thus independent as regards energy.

What is claimed is:

1. A solar-powered plant for desalinating and purifying salt-containing water, comprising:

a container for receiving the salt-containing water;

a thermal solar collector disposed above the container;

a heat exchanger disposed within the container;

a closed circuit for circulating a heat transfer medium between the solar collector and the heat exchanger to cause evaporation of water in the container;

a cooling surface made of heat-conductive material for condensing the evaporated water and disposed intermediate the container and the solar collector, the cooling surface and the solar collector forming between them a gap for circulating ambient air; and means operatively connected to the cooling surface for collecting condensed water.

2. The plant of claim 1, wherein the solar collector is of planar configuration and is disposed at a first angle of inclination relative to a given plane and wherein the cooling surface is disposed at a second angle of inclination different from the first angle whereby the gap is of tapered configuration.

3. The plant of claim 1, wherein a space is formed between the container and the cooling surface and further comprising means for enclosing the space.

4. The plant of claim 3, further comprising means for generating vacuum pressure in the space.

5. The plant of claim 4, further comprising photovoltaic means for powering the vacuum pressure generating means.

6. The plant of claim 1, wherein the cooling surface comprises a plurality of corrugations and wherein the condensed water collecting means comprises channels disposed below troughs formed by the corrugations.

7. The plant of claim 1, wherein the cooling surface comprises a plurality of corrugations and wherein the condensed water collecting means comprises a continuous fine coated mesh.

8. The plant of claim 1, wherein the container is of downwardly tapering configuration.

9. The plant of claim 1, further comprising a conveyor screw disposed at the bottom of the container for removing residue of the salt-containing water.

10. The plant of claim 9, wherein the conveyor screw is connected to a trough chain conveyor.

11. The plant of claim 1, wherein the salt-containing water is sea water and wherein the container is disposed at sea level and is provided with a conduit connecting to the sea at high tide.

12. The plant of claim 11, wherein a further heat exchanger is provided in the conduit and heat-conductively connected to the cooling surface.

13. The plant of claim 1, wherein the container is provided with a feed pump for feeding it from a source of salt-containing water.

14. The plant of claim 13, further comprising photovoltaic means for powering the feed pump.

15. The plant of claim 1, wherein the closed circuit further comprises a connectable absorber for operating a cooling unit.

16. The plant of claim 1, wherein the closed circuit further comprises a connectable absorber for operating a steam turbine for driving an electric generator.

* * * * *